Feb. 27, 1968 H. E. WADDELL 3,370,718
DRAFT GEAR
Filed Oct. 15, 1965 3 Sheets-Sheet 2

INVENTOR.
Harold E. Waddell
BY Edward T. Jurow
Atty.

Feb. 27, 1968     H. E. WADDELL     3,370,718
DRAFT GEAR
Filed Oct. 15, 1965     3 Sheets-Sheet 3
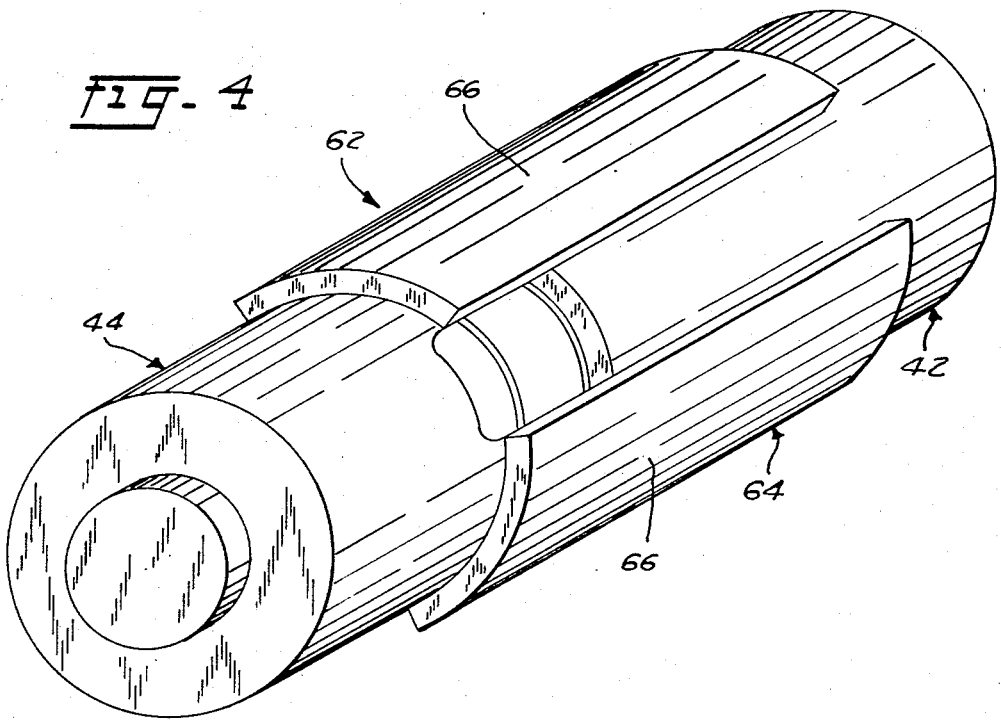
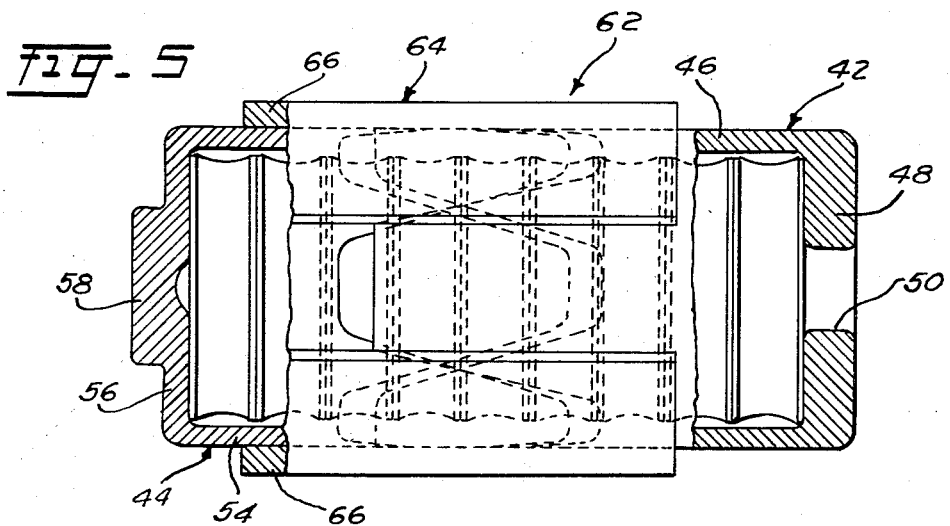
INVENTOR.
Harold E Waddell
BY Edward D. Jurow
Atty.

United States Patent Office 3,370,718
Patented Feb. 27, 1968

3,370,718
DRAFT GEAR
Harold E. Waddell, La Grange, Ill., assignor to W. H. Miner, Inc., Chicago, Ill., a corporation of Delaware
Filed Oct. 15, 1965, Ser. No. 496,460
2 Claims. (Cl. 213—32)

ABSTRACT OF THE DISCLOSURE

A friction draft gear having a stack of resilient pads retained in columnar relationship by a pair of cup-like members fitted over opposite ends of the stack and having interengageable fingers permitting compression of the stack of pads.

---

My present invention relates generally to draft gears and has particular reference to a friction draft gear wherein a stack of resilient pad units are used to resist inward movement of the friction shoes thereof.

The general object of my present invention is to provide an improved friction draft gear wherein a plurality of resilient pad units are used to provide shock absorbing capacity approximately two to three times greater than that of comparably sized coil springs now used in many A.A.R. standard friction draft gears. This increase in shock absorbing capacity of the cushioning means is reflected in a greatly increased overall draft gear capacity.

In many existing friction draft gears the space available for cushioning means is defined and limited by the interior portion of the draft gear housing. It is therefore a further object of my present invention to provide a suitable arrangement whereby resilient pad units may be readily substituted for the usual coil spring in a friction draft gear within the confines of the space available.

A more specific object of my present invention is to provide an improved friction draft gear of the class described wherein a pair of generally cylindrical guide casings are disposed about the resilient pad units to retain the same in longitudinally stacked relation.

A further object of my present invention is to provide a friction draft gear of the class described wherein the guide casings are provided with a plurality of interengageable tapered flanges which assist in maintaining the guide casing and the resilient pad units in substantial longitudinal alignment.

Another object of my present invention is to provide an economical, easily assembled, and trouble-free friction draft gear wherein high maximum capacity can be obtained in railway draft riggings and the like.

Now in order to acquaint those skilled in the art with the manner of constructing and using draft gears in accordance with the principles of my present invention, I shall describe in connection with the accompanying drawings, preferred embodiments of my invention.

In the drawings:

FIGURE 4 is a perspective view of another embodiment of cushioning means of my present invention, under conditions of load; and FIGURE 5 is a side elevational view of the cushioning means of FIGURE 4, with portions being broken away and shown in section.

Figure 1:
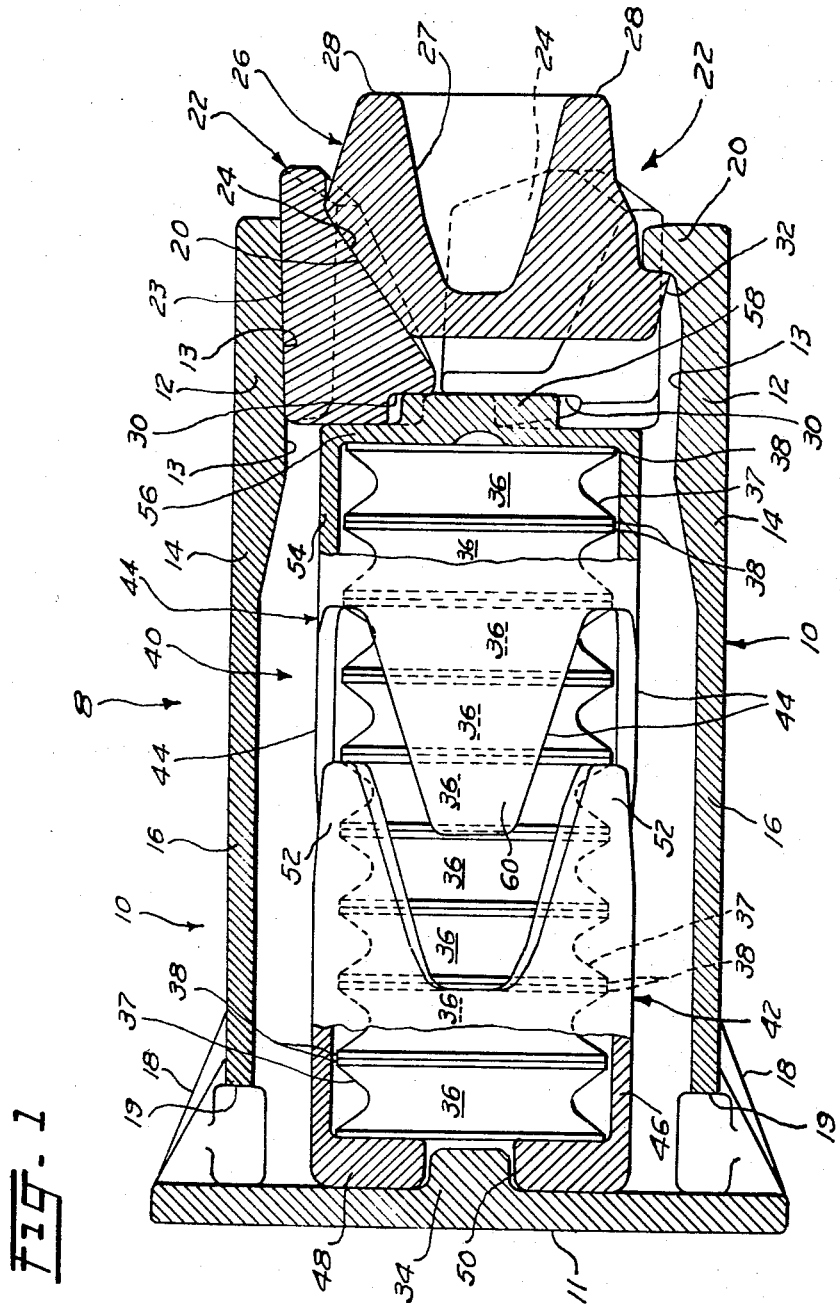
FIGURE 1 is a longitudinal median sectional view of a friction draft gear, under conditions of no load, incorporating one embodiment of cushioning means of my present invention which is shown partly in section and partly in elevation.

Referring now to FIGURE 1, there is indicated generally by the reference numeral 8 a friction draft gear incorporating the principles of my present invention. The friction draft gear 8 includes a housing 10 of hexagonal cross section, one end of which is closed by an enlarged rectangular end wall or plate 11. The housing 10 is provided adjacent its open end with a thick-walled friction shell section 12, of hexagonal cross section, having tapered inner friction surfaces 13 that converge in a direction toward the closed end of the housing 10. Inwardly of the friction shell section 12 and integral therewith is a relatively short transition wall section 14, with the inner surface thereof diverging in a direction toward the closed end of the housing, and with the wall thickness diminishing and tapering into a wall section 16 of uniformly thinner wall thickness. Eight peripherally spaced ribs 18 emerge from the outer surface of the wall section 16 and angle outwardly to support and brace the enlarged rectangular end wall 11 which is thus suitably reenforced to function as one of the followers of the mechanism for engagement with the usual buff lugs (not shown) of a conventional draft gear pocket. A pair of diametrically opposite casting holes 19 are formed in the wall section 16 of the casing 10 adjacent the end plate 11. The open end of the housing is provided with a series of three circumferentially spaced inwardly turned flange-like lugs 20 for a purpose to be described hereinafter.

Three wing-like friction shoes 22 are fitted into the friction shell section 12 in a circumferentially spaced relationship. The shoes 22 are characterized by pairs of tapered external friction surfaces 23 which are generally complementary to the friction surfaces 13 of the shell section 12. Inner tapered surfaces 24 of the shoes 22 define an outwardly opening six-sided pocket for receiving the inner end of a wedge 26. The wedge 26 is formed with a central recess 27 and with a flat annular rim 28 at the outer end thereof. The perimeter of the outer end of the wedge 26 is generally circular in cross section and the sides thereof diverge in a direction inwardly of the housing 10 in a manner such that a portion of rounded hexagonal cross section is defined midway between the inner and outer ends of the wedge. The inner end of the wedge 26 is characterized by six circumferentially arranged friction surfaces 29 which converge sharply in a direction inwardly of the housing 10 and are in continuous complementary engagement with the inner friction surfaces 24 of the shoes 22.

In friction draft gears of the general type described above, cushioning means are provided in the housing 10 for resisting inward movement of the friction shoes 22 and the wedge 26. The inner surfaces of the friction shoes 22 are suitably recessed, as at 30, to provide a seat for the cushioning means or for any follower device that might be associated therewith. As is well known to those skilled in the art, the wedge 26 is moved relatively inwardly of the housing 10 during the application of buff or draft forces to the draft gear. The cushioning means resists the simultaneous longitudinal and radial inward movements of the friction shoes 22 whereby to cushion and absorb a portion of the buff or draft forces. To retain the wedge 26 and the shoes 22 in the open end of the housing 10, despite the outward biasing action of the cushioning means, the wedge 26, adjacent the inner end, is provided with a series of circumferentially spaced outwardly projecting flange-like lugs 32 which correspond in number and spacing to the inwardly projecting lugs 20 at the open end of the housing 10. During assembly of the draft gear, the lugs 32 of the wedge 26 are engaged inwardly of the lugs 20 of the housing 10 whereby the wedge 26 and the shoes 22 are positively retained in the open end of the housing 10.

When the cushioning means, in the friction draft gear illustrated and described hereinbefore, is comprised of coil springs, the draft gear becomes a widely used and commericaliy successful draft gear which is manufactured and sold by W. H. Miner, Inc. and which is known in the trade as a Miner Class A–22–XL Friction Draft Gear. This draft gear is rated at a shock absorbing capacity of approximately 23,000 foot pounds at a reaction level of 300,000 pounds. To provide a seat for the inner coil spring of this gear, a lug 34, projecting inwardly of the housing 10 from the center of the end wall 11, is provided to receive and position the inner end thereof.

Figure 2:
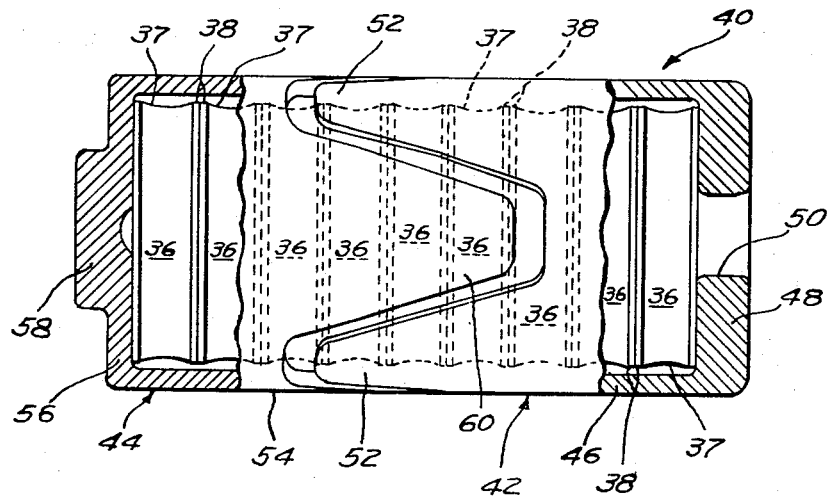
FIGURE 2 is a side elevational view of the cushioning means of FIGURE 1, under conditions of load, with portions being broken away and shown in section.

The purpose of my present invention is to upgrade or increase the capacity of the Miner A–22–XL gear in a simple and economical manner. As shown in FIGURES 1 and 2, the cushioning means 40 of my invention comprises a stacked series of compressible elastomeric resilient pad units 36, preferably nine in number. Each unit 36 comprises a disc-shaped elastomer pad 37 interposed between and bonded to a pair of circular metal plates 38. The diameter of the metal plates 38 is as large as possible, yet small enough to permit insertion of the units 36 through the open end of the housing 10 past the lugs 20 thereof. It is thus evident that the diameter of the resilient pad units 36 is considerably less than the inner diameter of the hexagonal wall section 16 of the housing 10. Due to the difference in the diameters of the pad units 36 and the housing 10, the wall section 16 of the housing 10 does not provide suitable guiding action for retaining the units 36 in proper stacked relation during longitudinal movement of the latter when buff and draft forces are applied to the draft gear. Special provision is therefore made for retaining the stack of units 36 in longitudinal alignment in respect to each other and to the housing 10.

In this connection, a pair of first and second relatively longitudinally movable casing members 42 and 44 respectively receive and are disposed about the opposite ends of the stacked series of resilient pad units 36 for retaining the latter in stacked relation. The first casing member 42 has a generally cylindrical body portion 46 with a retaining wall or follower plate 48 at one end thereof which abuts the closed end wall 11 of the housing 10. The retaining wall 48 has an opening 50 formed therein for receiving the end wall lug 34. The other end of the casing body 46 is provided with three circumferentially spaced longitudinally projecting tapered flanges 52 each of which has sides converging in a direction moving away from the retaining wall 48. Similarly, the second casing member 44 has a generally cylindrical body portion 54 with a retaining wall or follower plate 56 at one end thereof which abuts the inner faces of the friction shoes 22. The retaining wall 56 is formed with a projection 58 that is received in the recess 30 of the friction shoes 22. The body portion 54 at the other end thereof is provided with three circumferentially spaced longitudinally projecting tapered flanges 60 each of which has sides that converge in a direction moving away from the retaining wall 56. When the described cushioning device 40 is assembled in the draft gear 8, the cooperating lug 34 and opening 50, and the cooperating recess 30 and projection 58, serve to center and position the cushioning device. Also, the outer ends of the tapered flanges of each of the casing members project into the spaces between the tapered flanges of the other casing member, and the tapered flanges are thus arranged to serve as cooperating guide elements. As the casing members move relatively toward each other during compression of the pad units 36 toward the loaded condition of FIGURE 2, the tapered flanges are interengageable along their sides for guiding the casing members whereby to assist in maintaining the casing members and the pad units in substantial longitudinal alignment while also limiting relative rotative movement between the casing members. As shown in FIGURE 1, the resilient pads 37, in their non-compressed state, have their peripheries indented or recessed so that when they are compressed at full closure of the draft gear, as shown in FIGURE 2, the pads 37 will not bulge outwardly beyond the peripheral edges of the metal plates 38.

Figure 3:
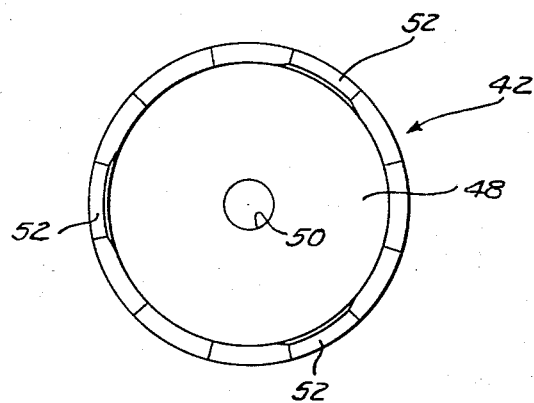
FIGURE 3 is an end view of the tapered flanges of one of the guide casings of the cushioning means of FIGURE 1.

Referring now to FIGURES 4 and 5, there is indicated generally by the reference numeral 62 another embodiment of cushioning means which incorporates the principles of my present invention and which is adapted to be assembled within the draft gear housing 10. The cushioning means 62 is similar in construction and operation to the cushioning means 40 shown in FIGURES 1–3 and described hereinabove, and like reference numerals have been applied to identify the same or similar parts. The principal difference is that in the cushioning means 62 longitudinally extending sleeve means 64, for example in the form of three arcuate plate members 66, is secured to the second casing member 44. The sleeve means 64 slidably receives the adjacent end of the first casing member 42 for additionally aligning and guiding the casing members during relative longitudinal movement therebetween.

From the foregoing description it will be appreciated that I have provided cushioning means, comprised of resilient pad units which may be readily substituted for the usual coil spring in a friction draft gear housing within the confines of the space available. In addition, I have provided means, in the form of a pair of guide casings, for retaining the resilient pad units in longitudinally stacked relation. Moreover, the guide casings are provided with a plurality of interengageable tapered flanges, and sleeve means if desired, which assist in maintaining the guide casings and the resilient pad units in substantial longitudinal alignment. The cushioning arrangements of my present invention, which utilize resilient pad units, provide shock absorbing capacity approximately two to three times greater than that of comparably sized coil springs now commonly used in many A.A.R. standard friction draft gears.

While I have shown and described what I believe to be preferred embodiments of my present invention, it will be understood by those skilled in the art that various rearrangements and modifications may be made therein without departing from the spirit and scope of my invention.

I claim:

1. For use in a friction draft gear of the type comprising an elongated housing having a closed end and an open end which is provided with internal slightly tapered friction surfaces, friction shoes at the open end of the housing and engaging the friction surfaces, and a wedge member engaging the friction shoes and arranged for actuating the same upon movement thereof inwardly of the housing, the combination of a stacked series of resilient pad units disposed in said housing for resiliently resisting inward movement of the friction shoes, a pair of first and second relatively longitudinally movable casing members respectively receiving the opposite ends of said stacked series of resilient pad units for retaining the latter in stacked relation, said first casing member abutting the closed end of the housing and said second casing member abutting the friction shoes, said first and second casing members each having a generally cylindrical body portion with a retaining wall at one end thereof and with three circumferentially spaced longitudinally projecting tapered flanges at the other end thereof which have sides converging in a direction moving away from said retaining wall, and wherein said tapered flanges of said casing members are interengageable whereby to assist in maintaining said casing members and said pad units in substantial longitudinal alignment and to limit relative rotative movement between said casing members.

2. The combination of claim 1 including longitudinally extending sleeve means secured to one of said casing members and slidably receiving the other of said casing members for guiding said casing members during relative longitudinal movement therebetween.

References Cited

UNITED STATES PATENTS

| 1,741,651 | 12/1929 | O'Connor | 213—40 |
| 2,463,366 | 3/1949 | Evans | 213—45 |
| 2,764,300 | 9/1956 | Withall | 213—32 |

ARTHUR L. LA POINT, *Primary Examiner.*

DRAYTON E. HOFFMAN, *Examiner.*